(12) United States Patent
Ozaki et al.

(10) Patent No.: US 8,825,257 B2
(45) Date of Patent: Sep. 2, 2014

(54) AUTONOMOUS NAVIGATION METHOD AND AUTONOMOUS MOBILE BODY

(75) Inventors: Koichi Ozaki, Tochigi (JP); Rahok Samann, Tochigi (JP)

(73) Assignee: Utsunomiya University, Tochigi (JP)

( * ) Notice: Subject to any disclaimer, the term of this patent is extended or adjusted under 35 U.S.C. 154(b) by 25 days.

(21) Appl. No.: 13/509,707

(22) PCT Filed: Nov. 16, 2010

(86) PCT No.: PCT/JP2010/006716
§ 371 (c)(1),
(2), (4) Date: Jul. 9, 2012

(87) PCT Pub. No.: WO2011/061924
PCT Pub. Date: May 26, 2011

(65) Prior Publication Data
US 2013/0282222 A1 Oct. 24, 2013

(30) Foreign Application Priority Data
Nov. 17, 2009 (JP) .................................. 2009-261503

(51) Int. Cl.
*G05D 1/02* (2006.01)
(52) U.S. Cl.
CPC ..................................... *G05D 1/0259* (2013.01)
USPC .......................................................... 701/23
(58) Field of Classification Search
USPC .......................................................... 701/23
See application file for complete search history.

(56) References Cited

U.S. PATENT DOCUMENTS 4,777,785 A * 10/1988 Rafaels ...................... 56/10.2 A
5,341,130 A * 8/1994 Yardley et al. ................. 340/3.1

(Continued)

FOREIGN PATENT DOCUMENTS

JP  2000-242330 A  9/2000
JP  2001-296923 A  10/2001

(Continued)

OTHER PUBLICATIONS

Shinnoh, Toshifumi. "Case Studies of the Environmental Magnetic Field Measuring Method (No. 3)". IN: Architectural Institute of Japan, Summaries of Technical Papers of Annual Meeting; Sep. 1996; pp. 1011-1012.

(Continued)

*Primary Examiner* — John R Olszewski
*Assistant Examiner* — James M McPherson
(74) *Attorney, Agent, or Firm* — Pearne & Gordon LLP (57) ABSTRACT

An autonomous navigation method is a method of causing a mobile body (100) to autonomously navigate while comparing environmental magnetism data obtained in advance by measuring magnetism generated along a navigation path on which the mobile body (100) navigates and measured magnetism detected by actually measuring the magnetism generated along the navigation path when the mobile body (100) navigates along the navigation path. The method includes a step (a) of detecting first measured magnetism and second measured magnetism in different positions on the mobile body (100) and a step (b) of causing the mobile body (100) to autonomously navigate on the basis of the second measured magnetism detected by a magnetism sensor (103), which is not affected by unexpected magnetism (G) not included in the environmental magnetism data, and the environmental magnetism data.

8 Claims, 7 Drawing Sheets

(56) References Cited

U.S. PATENT DOCUMENTS

| | | | |
|---|---|---|---|
| 5,925,080 A * | 7/1999 | Shimbara et al. | 701/23 |
| 6,272,405 B1 * | 8/2001 | Kubota | 701/23 |
| 6,516,272 B2 * | 2/2003 | Lin | 701/472 |
| 7,103,457 B2 * | 9/2006 | Dean | 701/23 |
| 7,239,944 B2 * | 7/2007 | Dean | 701/24 |
| 7,805,220 B2 * | 9/2010 | Taylor et al. | 700/253 |
| 8,275,506 B1 * | 9/2012 | Bishel | 701/25 |
| 2004/0010343 A1 * | 1/2004 | Dean | 700/245 |
| 2008/0109126 A1 * | 5/2008 | Sandin et al. | 701/23 |
| 2009/0076673 A1 * | 3/2009 | Brabec | 701/23 |
| 2013/0166195 A1 * | 6/2013 | Bandyopadhyay et al. | 701/412 |
| 2013/0184924 A1 * | 7/2013 | Jagenstedt et al. | 701/23 |
| 2013/0211782 A1 * | 8/2013 | Rosenberg et al. | 702/182 |

FOREIGN PATENT DOCUMENTS

| | | |
|---|---|---|
| JP | 2002-073171 A | 3/2002 |
| JP | 2002-108447 A | 4/2002 |
| JP | 2007-219960 A | 8/2007 |
| JP | 2008-052324 A | 3/2008 |
| JP | 2009-291035 A | 12/2009 |

OTHER PUBLICATIONS

International Search Report for PCT/JP2010/006716; Dec. 21, 2010.

* cited by examiner

AUTONOMOUS NAVIGATION METHOD AND AUTONOMOUS MOBILE BODY

TECHNICAL FIELD

The present invention relates to a method of causing a robot and the like to autonomously navigate using magnetism as a marker.

BACKGROUND ART

In recent years, a wide variety of robots operate in various scenes. Above all, a robot that autonomously navigates while recognizing the self-position during the navigation is expected to be a help for a human in a factory, an office, a hospital, or the like. Researches for the robot are actively carried out.

As one of guiding methods for causing a robot to autonomously navigate, a guiding method for guiding the robot using magnetism as a marker is known. This is typically a method of setting, for example, a magnetic marker made of a magnetic tape on a navigation path, providing, in the robot, a magnetism sensor that detects magnetism emitted from the magnetic marker, and detecting the magnetic marker using the magnetism sensor to thereby recognize the self-position (e.g., Patent Literature 1 and Patent Literature 2).

However, the method of setting the magnetic marker has to calculate a magnetic field distribution of an environment beforehand and set the magnetic marker in a place where magnetic noise is little. Therefore, a burden applied to work for setting the marker is large. This burden also occurs when the navigation path is changed. In general, the magnetic marker is set on the floor. However, in some case, it is undesirable on aesthetic grounds to set the magnetic marker on the floor surface.

CITATION LIST

Patent Literature

Patent Literature 1: Japanese Patent Application Laid-Open Publication No. 2002-73171
Patent Literature 2: Japanese Patent application Laid-Open Publication No. 2007-219960

Non-Patent Literature

Non-Patent Literature 1: Toshifumi Shinnoh, "Case Studies of the Environmental Magnetic Field Measuring Method (No. 3)", Architectural Institute of Japan, Summaries of Technical Papers of Annual Meeting, September 1996

SUMMARY OF INVENTION

Technical Problem

Ferromagnetic bodies such as iron frames and iron reinforcing bars structuring a building and iron members that are components of apparatuses, furniture, electric products, and the like set in the building are inevitably magnetized in processes of manufacturing and construction and thus carry residual magnetism. The intensity of this residual magnetism hardly fluctuates with respect to the elapse of time (Non-Patent Literature 1). Therefore, the inventors proposed earlier a method of, although based on the premise that magnetism is used as a marker for self-position recognition, rather than setting a magnetic marker anew and using generated magnetism, storing information on magnetism generated depending on indoor and outdoor environments as described above (hereinafter referred to as "environmental magnetism") and comparing data of this environmental magnetism and actually measured magnetism to recognize the self-position and autonomously navigate (Japanese Patent Application Laid-Open Publication No. 2008-142792).

However, when the autonomous navigation that uses the environmental magnetism is performed outdoors, the inventors experienced that a robot sometimes misrecognizes the self-position and deviates from a set navigation path.

Therefore, it is an object of the present invention to provide an autonomous navigation method and an autonomous mobile body that can prevent the robot from misrecognizing the self-position even if the autonomous navigation that uses the environmental magnetism is performed outdoors.

Solution to Problem

The inventors examined a cause of the misrecognition of the self-position that occurs when the autonomous navigation that uses the environmental magnetism is performed outdoors and acquired knowledge described below.

(1) It is desirable to sample environmental magnetism data continuously and without omission on a navigation path. However, this reduces the speed of a mobile body and is unrealistic because the number of data increases and computing processing requires long time. Therefore, since the environmental magnetism data is sampled at every predetermined interval on the navigation path, a magnetism map that does not reflect magnetism actually generated between data sampling points is sometimes created. For example, iron members such as covers of manholes and street gutters that are placed outdoors and iron poles on the streets are magnetized. However, when a magnetism map is created, since magnetism generated in these members is not measured, environmental magnetism data in the region and actually measured environmental magnetism (measured magnetism) do not match in the region. Therefore, when the mobile body reaches the region, the mobile body sometimes cannot recognize the self-position (2) As the environmental magnetism, only static environmental magnetism generated by fixed objects such as buildings are assumed. However, objects having magnetism travel outdoors. For example, the objects are automobiles, motorbikes, and the like. The magnetism of these objects can be considered dynamic environmental magnetism. When dynamic magnetism passes nearby, the static magnetism added with the dynamic magnetism is detected as actually measured environmental magnetism. Therefore, environmental magnetism data created targeting only the static environmental magnetism and the measured magnetism do not match. Therefore, when the dynamic magnetism is generated, the mobile body sometimes cannot recognize the self-position.

Figure 7A:
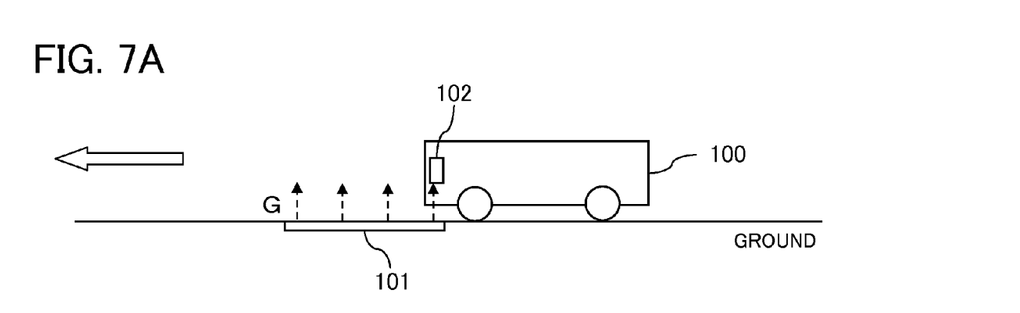
FIG. 7 is a diagram for describing the concept of the present invention.

When the measured magnetism includes unexpected magnetism that is not present in the environmental magnetism data, the mobile body travels deviating from the navigation path if the unexpected magnetism remains included in the measured magnetism. However, for example, as shown in FIG. 7A, when a magnetized manhole 101 is considered, even if a magnetism sensor 102 provided in the front in the traveling direction (a white arrow) of a mobile body 100 is affected by magnetism G (a dotted line arrow) from the manhole 101 and detects the magnetism, the back of the mobile body 100 is not affected by the magnetism from the manhole 101. The magnetism from the manhole 101 is generated upward as shown in FIG. 7.

Figure 7B:
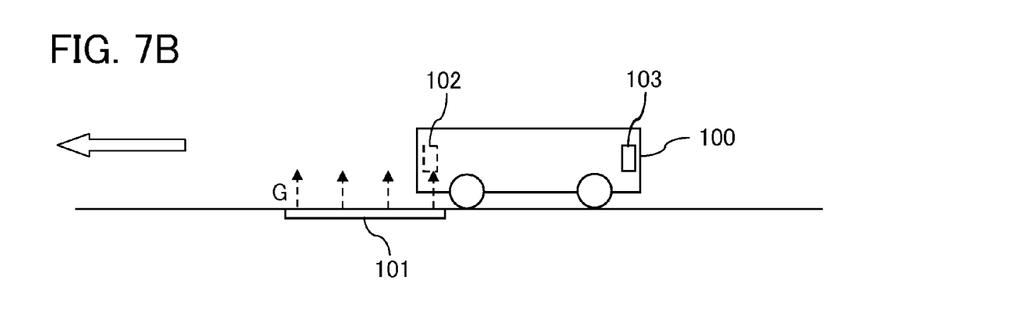

Therefore, as shown in FIG. 7B, a magnetism sensor 103 is also provided in the back of the mobile body 100. While the magnetism sensor 102 is affected by the magnetism G from the manhole 101, magnetism actually measured by the magnetism sensor 103 and the environmental magnetism data are compared. The mobile body 100 is caused to autonomously navigate on the basis of a result of the comparison.

Figure 7C:
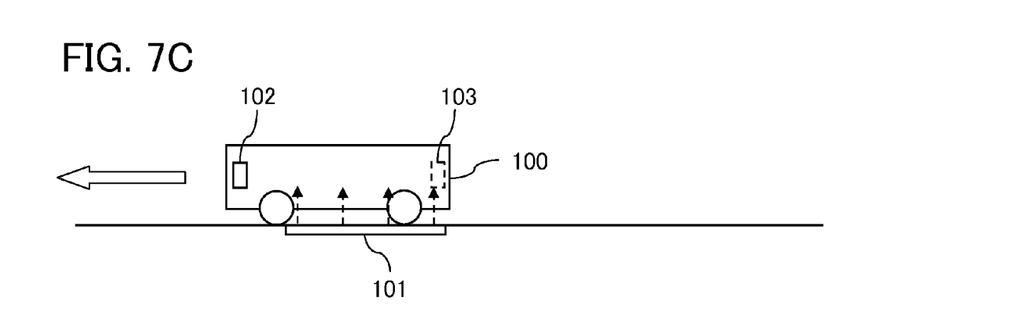

Further, as shown in FIG. 7C, if the mobile body 100 advances to a position where the magnetism sensor 102 is not affected by the magnetism G and the magnetism sensor 103 is affected by the magnetism G, this time, magnetism actually measured by the magnetism sensor 102 and the environmental magnetism data are compared. The mobile body 100 is caused to autonomously navigate on the basis of a result of the comparison.

As described above, the two magnetism sensors 102 and 103 are provided in the different positions of the mobile body 100 and selectively used. This makes it possible to prevent the mobile body 100 from misrecognizing the self-position because of the influence of the magnetism G from the manhole 101. This indicates that, by comparing measured magnetism, which matches the environmental magnetism data among at least two kinds of environmental magnetism (measured magnetism) detected in different positions on a mobile body, and the environmental magnetism data, even if unexpected magnetism not reflected on the environmental magnetism data is detected, it is possible to prevent misrecognition of the self-position.

The present invention is based on the examination results described above and based on the premise that the present invention causes a mobile body to autonomously navigate while comparing environmental magnetism data obtained in advance by measuring magnetism generated along a navigation path on which the mobile body navigates and measured magnetism detected by actually measuring the magnetism generated along the navigation path when the mobile body navigates along the navigation path.

An autonomous navigation method according to the present invention includes two steps (a) and (b) described below. In the first step (a), first measured magnetism and second measured magnetism are detected in different positions on a mobile body. In the second step (b), the mobile body is caused to autonomously navigate on the basis of the first measured magnetism or the second measured magnetism, which matches environmental magnetism data, and the environmental magnetism data.

Specifically, the step (b) can cause, when unexpected magnetism not included in the environmental magnetism data is detected as the first measured magnetism while causing the mobile body to autonomously navigate on the basis of a comparison result of the first measured magnetism and the environmental magnetism data, the mobile body to autonomously navigate on the basis of a comparison result of the second measured magnetism and the environmental magnetism data. Further, the step (b) can cause, when unexpected magnetism is detected as the second measured magnetism while causing the mobile body to autonomously navigate on the basis of the comparison result of the second measured magnetism and the environmental magnetism data, the mobile body to autonomously navigate on the basis of the comparison result of the first measured magnetism and the environmental magnetism data.

The present invention also provides a mobile body described below that can executes the autonomous navigation method described above.

This mobile body is caused to autonomously navigate while comparing environmental magnetism data obtained in advance by measuring magnetism generated along a navigation path and measured magnetism detected by actually measuring magnetism generated along the navigation path when the mobile body navigates along the navigation path.

A first magnetism sensor and a second magnetism sensor are provided on the mobile body. The second magnetism sensor is provided in a position on the mobile body different from the position of the first magnetism sensor. Therefore, the first magnetism sensor and the second magnetism sensor detect magnetism in the different positions on the mobile body. The mobile body includes a storing section that stores the environmental magnetism data.

The mobile body according to the present invention includes a control unit that causes the mobile body to autonomously navigate on the basis of the first measured magnetism or the second measured magnetism, which matches the environmental magnetism data, and the environmental magnetism data.

As a specific control procedure of the control unit, when unexpected magnetism not included in the environmental magnetism data is detected as the first measured magnetism while causing the mobile body to autonomously navigate on the basis of a comparison result of the first measured magnetism and the environmental magnetism data, the control unit causes the mobile body to autonomously navigate on the basis of a comparison result of the second measured magnetism and the environmental magnetism data. Further, when unexpected magnetism is detected as the second measured magnetism while causing the mobile body to autonomously navigate on the basis of the comparison result of the second measured magnetism and the environmental magnetism data, the control unit causes the mobile body to autonomously navigate on the basis of the comparison result of the first measured magnetisms and the environmental magnetism data.

In the mobile body according to the present invention, the first magnetism sensor and the second magnetism sensor only have to be provided to be spaced apart from each other in one or both of a traveling direction of the mobile body and a direction orthogonal to the traveling direction. Consequently, even if one of the first magnetism sensor and the second magnetism sensor is affected by unexpected magnetism, it is possible to prevent the other from being affected by the unexpected magnetism. The space between the first magnetism sensor and the second magnetism sensor is set as appropriate according to an environment in which the mobile body navigates.

Advantageous Effects of Invention

According to the present invention, even if measured magnetism includes unexpected magnetism, it is possible to perform autonomous navigation without misrecognizing the self-position by comparing measured magnetism not affected by the unexpected magnetism among at least two kinds of measured magnetism detected in different positions on a mobile body and the environmental magnetism data.

BRIEF DESCRIPTION OF THE DRAWINGS

FIG. 1 is a block diagram showing the configuration of a robot (a mobile body) according to an embodiment, wherein

DESCRIPTION OF EMBODIMENT

The present invention is described in detail below on the basis of an embodiment shown in the accompanying drawings.

Figure 1A:
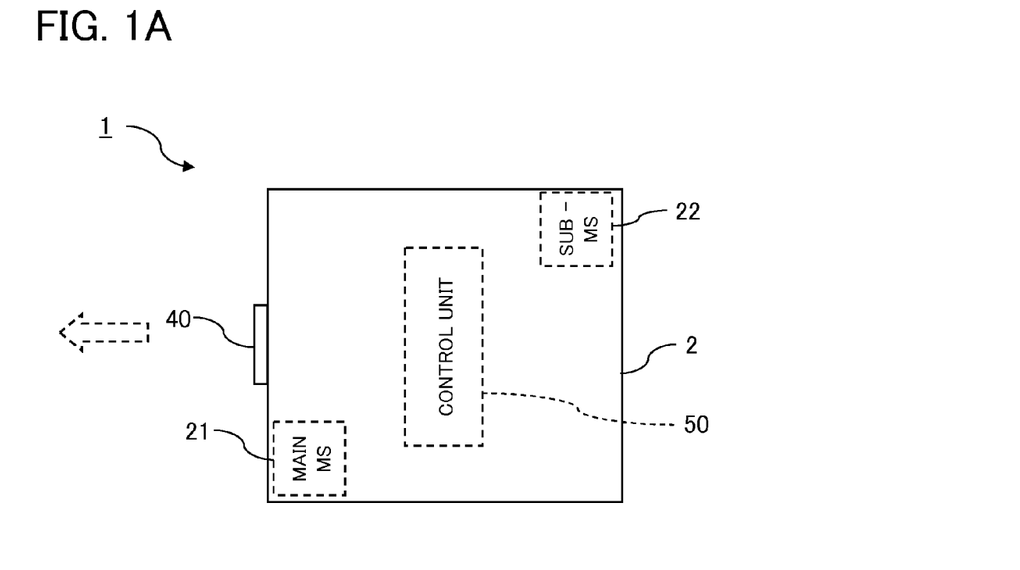
FIG. 1A is a plan view and FIG. 1B is a side view.
Figure 1B:
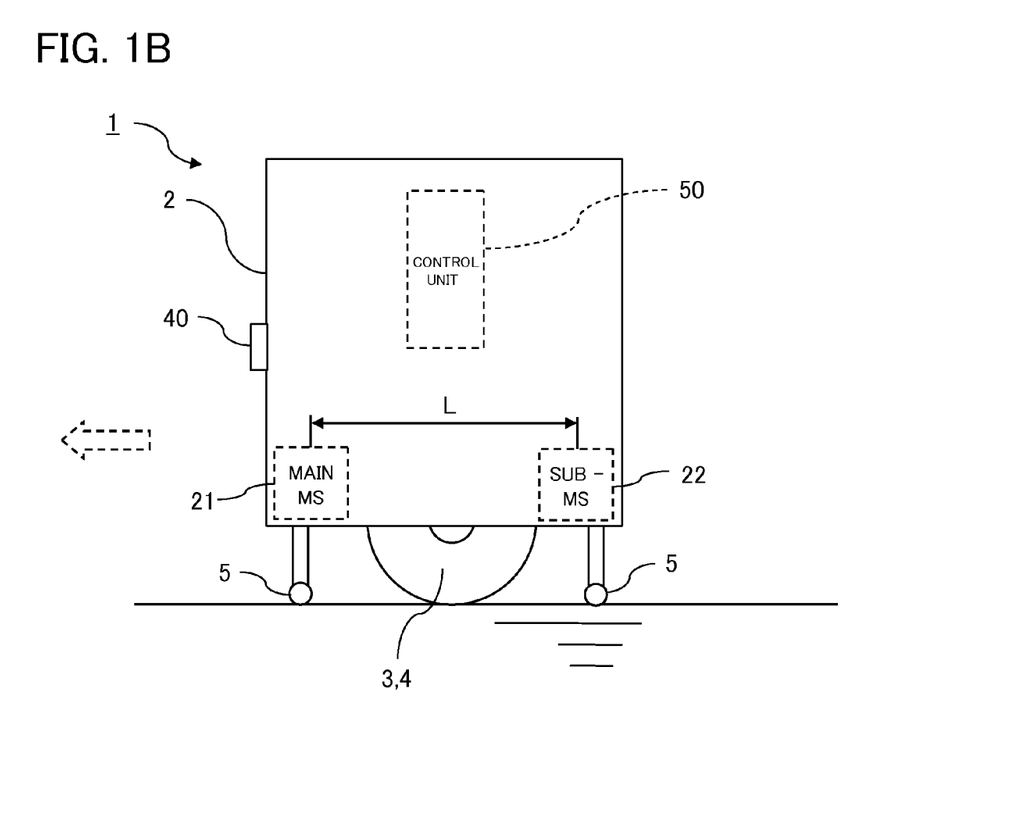

As shown in FIG. 1, a robot (a mobile body) 1 of a wheel type according to this embodiment includes a pair of left and right driving wheels 3 and 4 in a lower part in the center in the front rear direction of a box-like main body 2 and includes supporting wheels 5 respectively in lower parts practically at four corners of the main body 2.

A main magnetism sensor (a first magnetism sensor) 21 and a direction sensor 40 are provided in the front of the main body 2 and a sub-magnetism sensor (a second magnetism sensor) 22 is provided in the back of the main body 2. The main magnetism sensor 21 and the sub-magnetism sensor 22 are provided a space L apart from each other. The main magnetism sensor 21, the direction sensor 40, and the sub-magnetism sensor 22 are electrically connected to a control unit 50 set on the inside of the main body 2.

In an example described here, the main magnetism sensor 21 and the sub-magnetism sensor 22 are provided on the inside of the main body 2. However, if the main magnetism sensor 21 and the sub-magnetism sensor 22 can travel together with the main body 2, the main magnetism sensor 21 and the sub-magnetism sensor 22 can be also provided on the outside of the main body 2.

The main magnetism sensor 21 and the sub-magnetism sensor 22 can measure direct-current magnetism (hereinafter simply referred to as magnetism) along three axes orthogonal to one another. The three axes include an x axis along the traveling direction of the robot 1, a y axis parallel to the floor surface and orthogonal to the x axis, and a z axis parallel to the vertical direction and orthogonal to the x axis. The measured magnetism is used as measured magnetism that is used for creation of environmental magnetism data described later and is compared with the environmental magnetism data during autonomous navigation.

The direction sensor 40 measures angular velocity. The angular velocity is used by the robot 1 to change a direction in a route point. In an example described in this embodiment, the main magnetism sensor 21, the sub-magnetism sensor 22, and the direction sensor 40 are separate. However, a magnetic and direction sensor in which the sensors are integrated can also be used.

<Control Unit 50>

Figure 2:
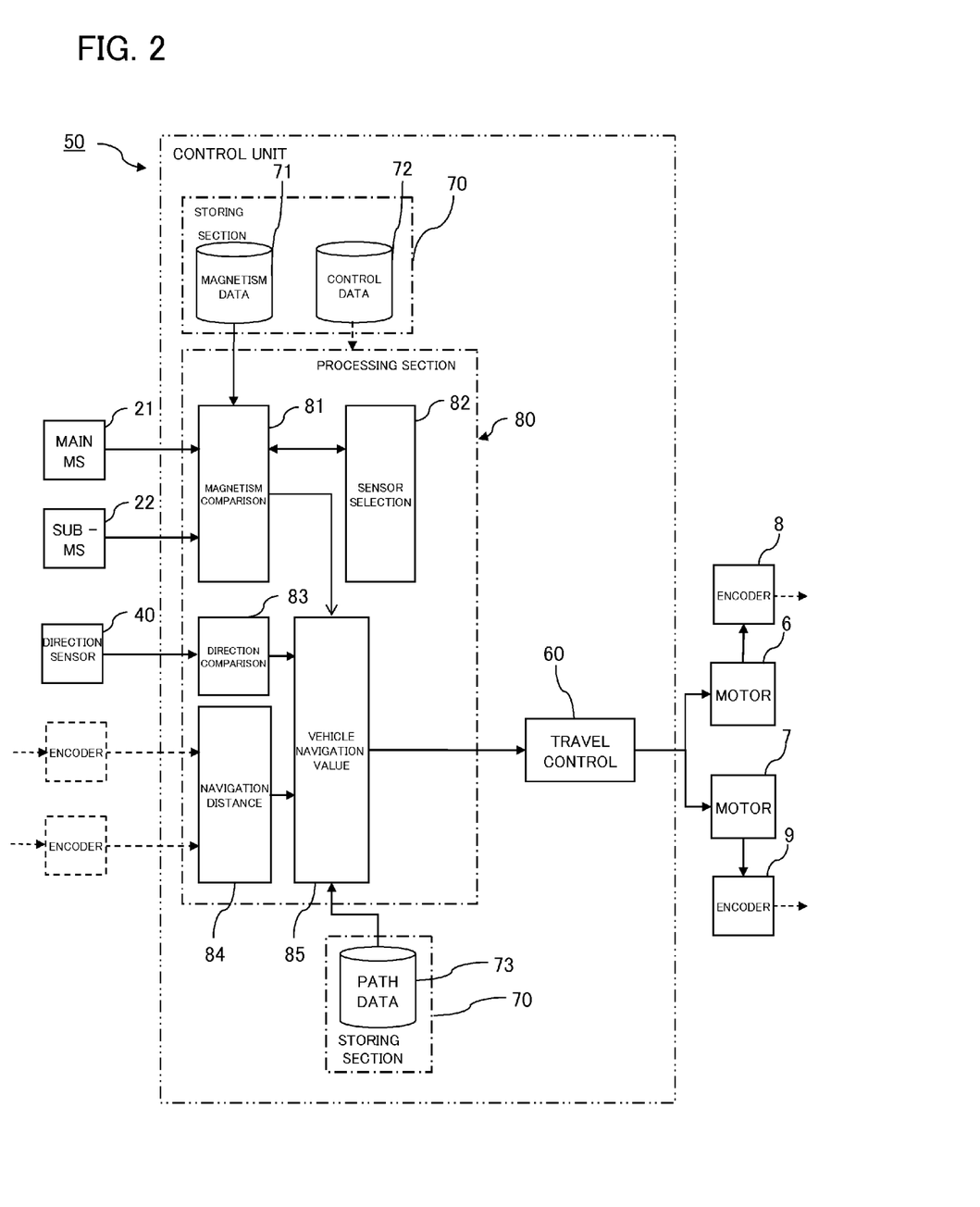
FIG. 2 is a block diagram showing the configuration of a control unit of the robot according to the embodiment.

The control Unit 50 is described with reference to FIG. 2.

The control unit 50 includes a traveling control section 60, a storing section 70, and a processing section 80. The control unit 50 is configured from a computer including a CPU, a ROM, a RAM, and input and output circuits, and the like.

<Traveling Control Section 60>

In the control unit 50, the driving wheels 3 and 4 are respectively driven to rotate by the driving motors 6 and 7 via a not-shown reduction gear. Rotary encoders 8 and 9 for detecting the rotating speeds (the numbers of revolutions) of the driving wheels 3 and 4 are respectively attached to the driving motors 6 and 7. Further, these driving motors 6 and 7 are controlled to be driven independently from each other by the traveling control section 60. The traveling control section 60 can change the direction of the robot 1 by rotating the driving motors 6 and 7 at the different numbers of revolutions.

<Storing Section 70>

The storing section 70 includes a first storing section 71, a second storing section 72, and a third storing section 73.

Environmental magnetism data is stored in the first storing section 71. The environmental magnetism data is data in which magnetism detected by the main magnetism sensor 21 and magnetism detected by the sub-magnetism sensor 22 and positions where the kinds of magnetisms are detected are associated with each other in advance along a path on which the robot 1 is caused to navigate. As this data, two sets of data, i.e., data concerning the main magnetism sensor 21 (main environmental magnetism data) and data concerning the sub-magnetism sensor 22 (sub-environmental magnetism data) are stored. A direction in which the robot 1 is navigated is controlled by comparing measured magnetism detected when the robot 1 autonomously travels and this environmental magnetism data.

Figure 6:
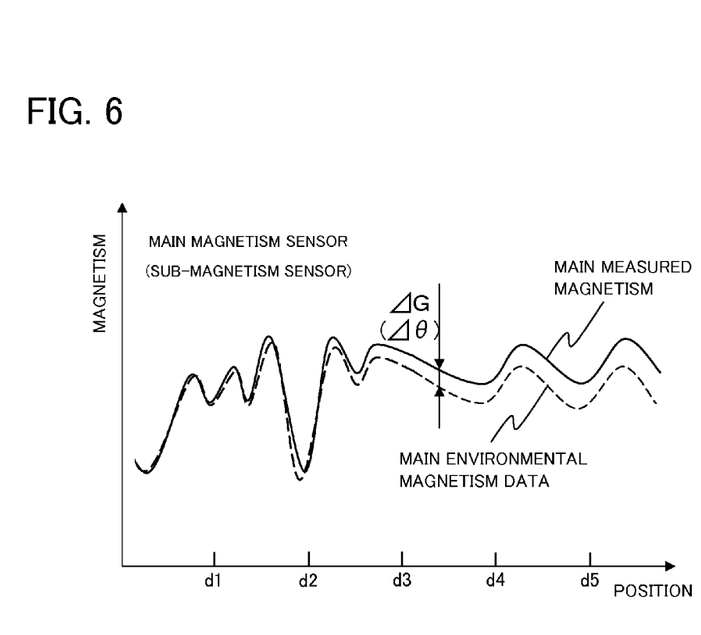
FIG. 6 is a diagram for describing a method of determining the direction of the navigation of the robot according to the embodiment.

For example, as shown in FIG. 6, the environmental magnetism data can be visualized as a graph, the x axis of which indicates a position on the navigation path and the y axis of which indicates the intensity of magnetism. This intensity of magnetism can be represented by, for example, the intensity of magnetism in the vertical direction. However, the intensity of magnetism can also be represented by the intensity of magnetism in the horizontal direction. There is no limitation in the present invention.

The environmental magnetism data is desirably continuously stored on the navigation path of the robot 1. However, this method is not realistic at the current technology level. This is because, if the length of the navigation path of the robot increases, considerable time is consumed for processing for comparison with the measured magnetism and the navigation speed markedly decreases. Therefore, it is realistic to store the environmental magnetism data at every predetermined interval.

In the second storing section 72, programs concerning various kinds of control performed by the traveling control section 60 and the processing section 80 are stored.

In the third storing section 73, path information in which a direction and a distance in which the robot 1 should advance are associated with each other is stored for each route of the navigation path divided into several blocks. For example, referring to FIG. 5 as an example, when the robot 1 navigates on a route from a route point A to a route point B, if the robot 1 changes the direction counterclockwise by $\phi 1°$ in the route point A and advances to the route point B by a distance $D_{A-B}$, $(-\phi 1°, D_{A-B})$ is stored in the third storing section 73 in association with the route point A. A path from a start point (Start) to the route point A, a path from the route point A to the route point B, a path from the route point B to a route point C, and a path from the route point C to an end point (Goal) are respectively referred to as "routes". A path obtained by connecting the routes from the start to the goal is referred to as navigation path.

<Processing Section 80>

The processing section 80 includes a magnetism comparing section 81 and a sensor selecting section 82.

The magnetism comparing section 81 compares the main environmental magnetism data stored in the first storing section 71 and measured magnetism (main measured magnetism) detected by the main magnetism sensor 21. The magnetism comparing section 81 compares the sub-environmental magnetism data stored in the first storing section 71 and measured magnetism (sub-measured magnetism) detected by the sub-magnetism sensor 22. According to this comparison, it is determined whether the main environmental magnetism data and the main measured magnetism are matched and whether the sub-environmental magnetism data and the sub-measured magnetism are matched. When unexpected magnetism is included in the main measured magnetism or the sub-measured magnetism, it is determined that the main environmental magnetism data and the sub-measured magnetism are not matched or the sub-environmental magnetism data and the sub-measured magnetism are not matched. A result of the determination is output to the sensor selecting section 82.

The sensor selecting section 82 selects any one of the main magnetism sensor 21 and the sub-magnetism sensor 22 as a sensor used for correction of the direction of the robot 1 when the robot 1 autonomously navigates on the routes. This selection is based on the determination result informed from the magnetism comparing section 81. If the determination result indicates that the main environmental magnetism data and the main measured magnetism are not matched, the sensor selecting section 82 selects the sub-magnetism sensor 22. If the determination result indicates that the sub-environmental magnetism data and the sub-measured magnetism are not matched, the sensor selecting section 82 selects the main magnetism sensor 21. A state in which the sensor is selected is hereinafter sometimes referred to as "active". However, in a default state, the main magnetism sensor 21 is selected. Unless a determination result that the main environmental magnetism data and the main measured magnetism are not matched is obtained, the robot 1 autonomously navigates while comparing the main measured magnetism detected by the main magnetism sensor 21 and the main environmental magnetism data and while the direction being controlled such that the main measured magnetism matches the main environmental magnetism data.

When the robot 1 navigates on the routes, the direction of the robot 1 is controlled as described below.

As described above, in the default state, the direction of the robot 1 is controlled on the basis of the comparison of the measured magnetism detected by the main magnetism sensor 21 and the main environmental magnetism data. More specifically, in FIG. 6, a deviation $\Delta G$ is present between the measured magnetism and the main environmental magnetism data because a deviation $\Delta \theta$ is present in the direction of the robot 1 with respect to a regular route. Therefore, it is possible to cause the robot 1 to autonomously navigate on a route in a correct direction by controlling the direction of the robot 1 to eliminate the deviation $\Delta G$ of magnetism. To cause the robot 1 to autonomously navigate, the magnetism comparing section 81 calculates a direction from the deviation $\Delta G$ between the measured magnetism and the main environmental magnetism data and outputs the direction to a vehicle navigation value calculating section 85.

The processing section 80 includes a direction comparing section 83 and a navigation distance calculating section 84.

The direction comparing section 83 integrates angular velocity detected by the direction sensor 40 (a default value is 0 degree with respect to the first route) and calculates a direction (an angle $\theta$) with respect to the route. The calculated direction is output to the vehicle navigation value calculating section 85.

The navigation distance calculating section 84 separately counts pulses respectively input from the rotary encoders 8 and 9 and multiplies counted values with a navigation amount per one pulse to calculate navigation distances that the robot 1 navigates so far. Two navigation distances are calculated. An average of the navigation distances is output to the vehicle navigation value calculating section 85 as a navigation distance.

The vehicle navigation value calculating section 85 calculates position information of the robot 1. This position information is specified by the direction (the angle $\theta$) with respect to the traveling path in addition to a plane coordinate indicated by x and y (x, y, $\theta$).

The vehicle navigation value calculating section 85 reads out the path information from the third storing section 73. In the path information, as described above, the direction information and the navigation distance information are associated with each other (e.g., $(-\phi 1°, D_{A-B})$). The vehicle navigation value calculating section 85 calculates, from the navigation distance S and the navigation distance information acquired from the navigation distance calculating section 84, a residual navigation distance until the robot 1 reaches an end point of the route. This residual navigation distance is output to the traveling control section 60.

The vehicle navigation value calculating section 85 calculates an angle (a rotation angle) of the change of the direction by the robot 1 such that the deviation $\Delta G$ between the measured magnetism and the main environmental magnetism data acquired from the magnetism comparing section 81 decreases to 0 (zero). This rotation angle is output to the traveling control section 60. Adjustment of this direction can be performed by feedback control.

When the robot 1 reaches the end point of the route, the vehicle navigation value calculating section 85 calculates an angle (a rotation angle) of the change of the direction by the robot 1 in a route point from the direction (angle $\theta$) information and the direction information in the path information with respect to the route acquired from the direction comparing section 83. This rotation angle is output to the traveling control section 60.

<Traveling Control Section 60>

The traveling control section 60 outputs, on the basis of the residual navigation distance calculated by the vehicle navigation value calculating section 85, a driving command to the driving motors 6 and 7 such that the robot 1 navigates to the next route point along the route. When the robot 1 reaches the route point, the traveling control section 60 outputs, on the basis of the rotation angle calculated by the vehicle navigation value calculating section 85, a driving command to the driving motors 6 and 7 in order to change the direction of the robot 1 to match the next route.

<Active Change of the Main Magnetism Sensor 21 and the Sub-Magnetism Sensor 22>

Figure 3:
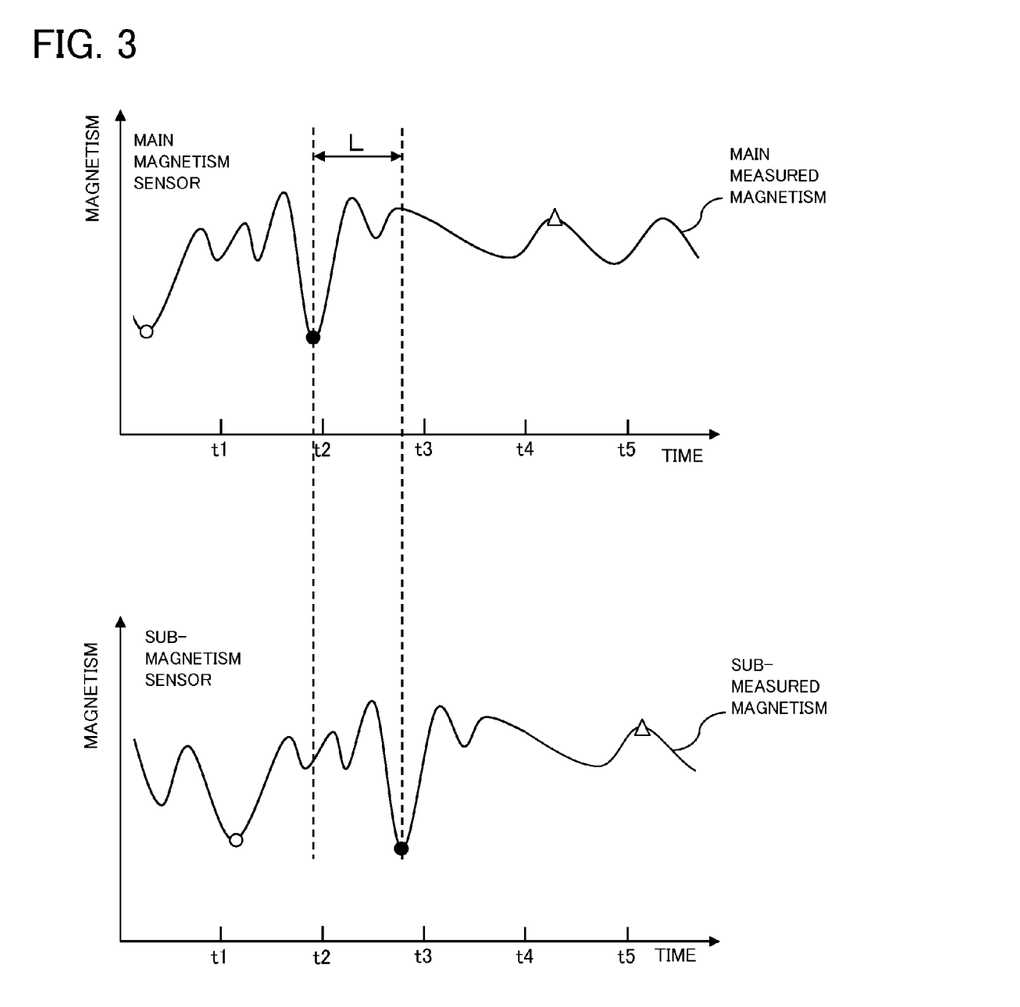
FIG. 3 is a graph showing main measured magnetism detected by a main magnetism sensor and sub-measured magnetism detected by a sub-magnetism sensor of the robot according to the embodiment in association with each other.
Figure 4:
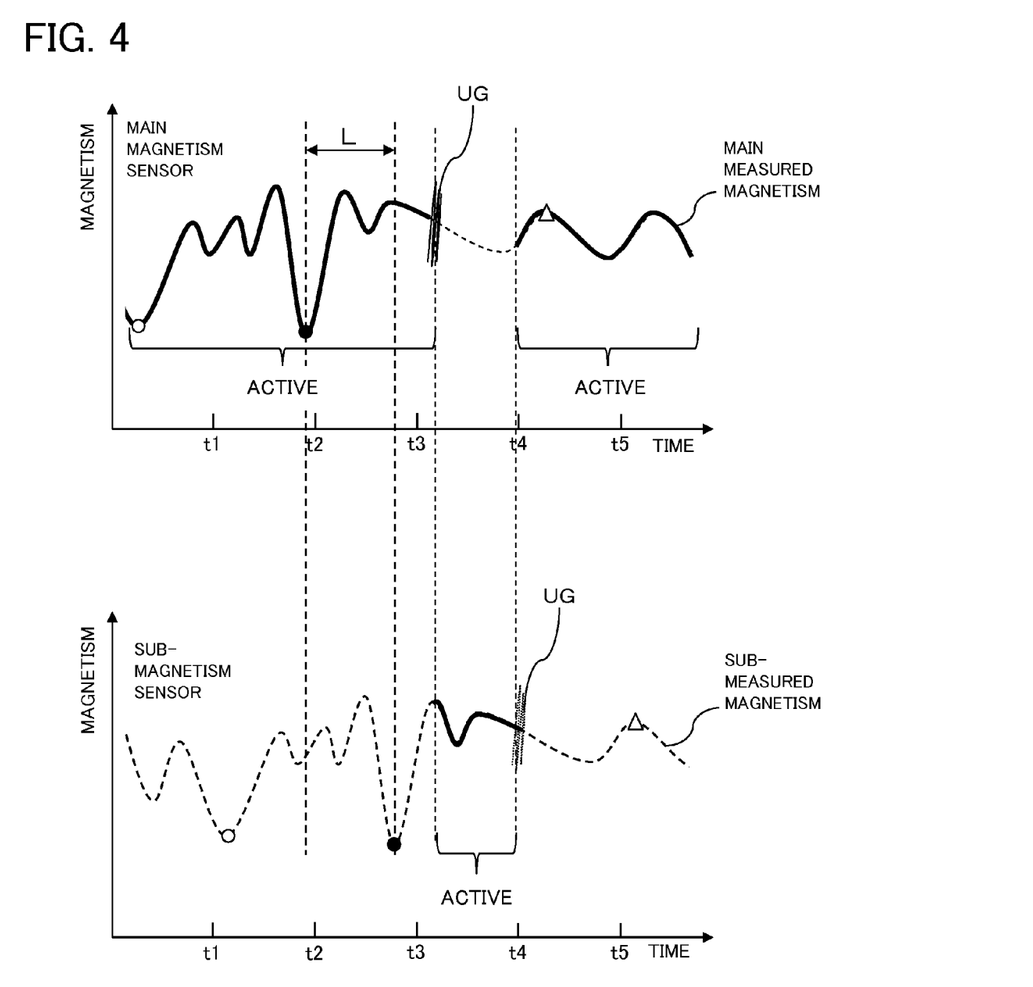
FIG. 4 is a graph showing the main measured magnetism detected by the main magnetism sensor and the sub-measured magnetism detected by the sub-magnetism sensor of the robot according to the embodiment in association with each other, wherein the main measured magnetism and the sub-measured magnetism include unexpected magnetism.

Characteristics of this embodiment are described below with reference to FIGS. 3 to 5.

The sub-magnetism sensor 22 is arranged behind the main magnetism sensor 21 by a distance L (with reference to the traveling direction). Therefore, as shown in FIG. 3, sub-measured magnetism detected by the sub-magnetism sensor 22 is detected with a delay equivalent to the distance L with respect to main measured magnetism detected by the main magnetism sensor 21. Since unexpected magnetism is not included in the main measured magnetism and the sub-measured magnetism shown in FIG. 3, the main magnetism sensor 21 is active. In FIG. 3, a circle, a black circle, and a triangle indicate that magnetism detection positions are the same.

Main measured magnetism and sub-measured magnetism including unexpected magnetism are described with reference to FIG. 4. FIG. 4 indicates that the magnetism sensors corresponding to sections where measured magnetism is indicated by solid lines are active.

When time t3 elapses after the robot 1 starts navigation, the active main magnetism sensor 21 detects unexpected magnetism UG as main measured magnetism. Then, the magnetism comparing section 81 compares the main measured magnetism and the main environmental magnetism data to thereby determine that the main magnetism sensor 21 detects the unexpected magnetism UG. The magnetism comparing section 81 outputs the determination to the sensor selecting section 82. The sensor selecting section 82 activates the sub-magnetism sensor 22 and, on the other hand, inactivates the main magnetism sensor 21 on the basis of the determination. Concerning the activation and the inactivation, in FIG. 4, the main measured magnetism by the main magnetism sensor 21 is indicated by a dotted line and the sub-measured magnetism by the sub-magnetism sensor 22 is indicated by a solid line.

The sub-magnetism sensor 22 is activated and the robot 1 continues the autonomous navigation while adjusting the direction. However, when the robot 1 navigates by the distance L, the sub-magnetism sensor 22 sometimes detects the unexpected magnetism UG. Then, the magnetism comparing section 81 compares the sub-measured magnetism and the sub-environmental magnetism data to thereby determine that the sub-magnetism sensor 22 detects the unexpected magnetism UG. The magnetism comparing section 81 outputs the determination to the sensor selecting section 82. The sensor selecting section 82 activates the main magnetism sensor 21 and, on the other hand, inactivates the sub-magnetism sensor 22 on the basis of the determination. Concerning the activation and the inactivation, in FIG. 4, the main measured magnetism by the main magnetism sensor 21 is indicated by a solid line and the sub-measured magnetism by the sub-magnetism sensor 22 is indicated by a dotted line.

As the unexpected magnetism UG, there are magnetism by a fixed object such as a manhole and dynamic magnetism. These kinds of magnetism usually show a sudden change compared with the environmental magnetism data. It is possible to easily determine whether these kinds of magnetism match the environment magnetism data.

<Example of the Autonomous Navigation>

Figure 5:
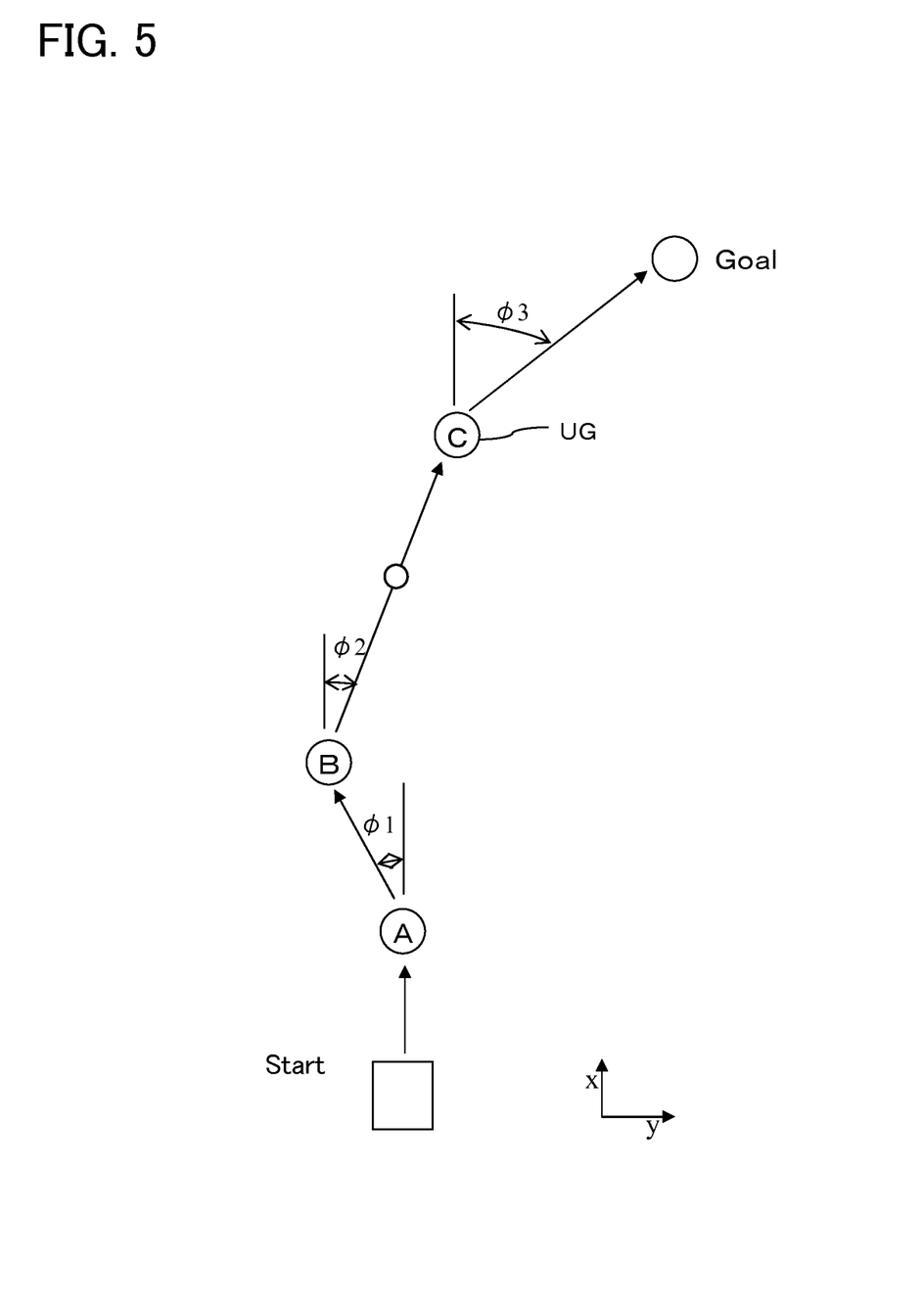
FIG. 5 is a diagram showing a navigation path of the robot according to the embodiment.

As shown in FIG. 5, when the robot 1 described above autonomously navigates from the start point (Start) to the end point (Goal), the main magnetism sensor 21 is activated and the robot 1 advances until the robot 1 reaches the route point A after starting the navigation from the start point.

When the robot 1 reaches the route point A, after changing the direction by $\phi 1$ counterclockwise, the robot 1 navigates toward the route point B. The main magnetism sensor 21 is active during this navigation as well.

When the robot 1 reaches the route point B, after changing the direction by $\phi 1+\phi 2$ clockwise, the robot 1 navigates toward the route point C. It is assumed that the unexpected magnetism UG is generated between the route point B and the route point C. Then, when the robot 1 advances and the main magnetism sensor 21 detects the unexpected magnetism UG, the main magnetism sensor 21 is inactivated and, on the other hand, the sub-magnetism sensor 22 is activated. Thereafter, if the sub-magnetism sensor 22 detects the unexpected magnetism UG, the main magnetism sensor 21 is activated and, on the other hand, the sub-magnetism sensor 22 is inactivated. The robot 1 autonomously navigates to the route point C.

When the robot 1 reaches the route point C, after changing the direction by $\phi 3-\phi 2$ clockwise, the robot 1 autonomously navigates to the end point.

As described above, the robot 1 includes the main magnetism sensor 21 and the sub-magnetism sensor 22. In a process in which one of the magnetism sensors is activated and the robot 1 autonomously navigates while controlling the direction of the robot 1, if the robot 1 detects unexpected magnetism not matching the environmental magnetism data, the robot 1 can activate the other magnetism sensor and control the direction of the robot 1. Therefore, even if the robot 1 encounters the unexpected magnetism, the robot 1 can continue the autonomous navigation without misrecognizing the self-position.

In the embodiment described above, the example in which the sub-magnetism sensor 22 detects the unexpected magnetism UG after the sub-magnetism sensor 22 is activated is described. However, the sub-magnetism sensor 22 does not always detect the unexpected magnetism UG in this way. Specifically, since the main magnetism sensor 21 and the sub-magnetism sensor 22 are spaced apart in the width direction of the robot 1 (the direction orthogonal to the traveling direction), unexpected magnetism detected by the main magnetism sensor 21 is not always detected by the sub-magnetism sensor 22. Then, the robot 1 sometimes reaches the end point of the navigation path while the sub-magnetism sensor 22 remains active. Thereafter, if the sub-magnetism sensor 22 does not detect the unexpected magnetism UG, the robot 1 autonomously navigates to the end point through the route point C while the main magnetism sensor 21 remains inactive and the sub-magnetism sensor 22 remains active.

In the embodiment described above, the main magnetism sensor 21 and the sub-magnetism sensor 22 are spaced apart in the traveling direction of the robot 1. However, the present invention is not limited to this. For example, the main magnetism sensor 21 and the sub-magnetism sensor 22 can be provided to be spaced apart only in the width direction of the robot 1 or can be provided to be spaced apart only in the height direction of the robot 1.

Further, in the embodiment described above, the two magnetism sensors, i.e., the main magnetism sensor 21 and the sub-magnetism sensor 22 are provided. However, the number of magnetism sensors is not limited to two. It goes without saying that the present invention can be realized even if the number of magnetism sensors is three or more.

Furthermore, the gist of the present invention is that measured magnetism not affected by unexpected magnetism among at least two kinds of environmental magnetism detected in different positions on a mobile body and the environmental magnetism data are compared. A control method for autonomous navigation of the mobile body excluding the comparison of the measured magnetism and the environmental magnetism data is not limited to the embodiment.

The example in which the autonomous navigation of the robot 1 is performed using the magnetism sensors and the direction sensor is described. However, the present invention permits performing the autonomous navigation by further combining other sensing means, for example, a distance sensor.

Besides, it is possible to sort out the components described in the embodiment or change the components to other components as appropriate without departing from the spirit of the present invention.

REFERENCE SIGNS LIST 1 robot
21 main magnetism sensor (first magnetism sensor)
22 sub-magnetism sensor (second magnetism sensor)
50 control unit
60 traveling control section
70 storing section
80 processing section
81 magnetism comparing section
82 sensor selecting section
83 direction comparing section
84 navigation distance calculating section
85 vehicle navigation value calculating section

The invention claimed is:

1. A method of causing a mobile body to autonomously navigate while comparing environmental magnetism data obtained in advance by measuring magnetism generated along a navigation path on which the mobile body navigates and measured magnetism detected by actually measuring the magnetism generated along the navigation path when the mobile body navigates along the navigation path, the method comprising:
    a step (a) of detecting both a first measured magnetism and a second measured magnetism at predetermined intervals during navigation of the mobile body, the detection of the first measured magnetism and second measured magnetism being performed in different positions on the mobile body; and
    a step (b) of causing the mobile body to autonomously navigate on the basis of a selected one of the first measured magnetism and the second measured magnetism, the selected one being specified by a matching property with the environmental magnetism data, and the environmental magnetism data, wherein when the selected one of the first measured magnetism and the second measured magnetism no longer has matching properties with the environmental magnetism data the other of said first measured magnetism and second measured magnetism is utilized for navigation.

2. The autonomous navigation method according to claim 1, wherein the step (b) includes causing, when unexpected magnetism not included in the environmental magnetism data is detected as the first measured magnetism while causing the mobile body to autonomously navigate on the basis of a comparison result of the first measured magnetism and the environmental magnetism data, the mobile body to autonomously navigate on the basis of a comparison result of the second measured magnetism and the environmental magnetism data.

3. The autonomous navigation method according to claim 2, wherein the step (b) includes causing, when unexpected magnetism is detected as the second measured magnetism while causing the mobile body to autonomously navigate on the basis of the comparison result of the second measured magnetism and the environmental magnetism data, the mobile body to autonomously navigate on the basis of the comparison result of the first measured magnetism and the environmental magnetism data.

4. The autonomous navigation method according to any one of claims 1 to 3, wherein the first measured magnetism and the second measured magnetism are detected while being spaced apart from each other in one or both of a traveling direction of the mobile body and a direction orthogonal to the traveling direction.

5. An autonomous mobile body that autonomously navigates while comparing environmental magnetism data obtained in advance by measuring magnetism generated along a navigation path and measured magnetism detected by actually measuring the magnetism generated along the navigation path when the mobile body navigates along the navigation path, the autonomous mobile body comprising:
    a first magnetism sensor that is provided on the mobile body and detects first measured magnetism;
    a second magnetism sensor that is provided in a position on the mobile body different from a position of the first magnetism sensor and detects second measured magnetism;
    a storing section that stores the environmental magnetism data; and
    a control unit that causes the mobile body to autonomously navigate on the basis of a selected one of the first measured magnetism and the second measured magnetism, the selected one being specified by a matching property with the environmental magnetism data, and the environmental magnetism data, wherein when the selected one of the first measured magnetism and the second measured magnetism non longer has matching properties with the environmental magnetism data the other of said first measured magnetism and second measured magnetism is utilized for navigation, and
    wherein the first magnetism sensor and second magnetism sensor both detect the first measured magnetism and second measured magnetism, respectively , at predetermined intervals during navigation of the mobile body.

6. The autonomous mobile body according to claim 5, wherein the control unit causes, when unexpected magnetism not included in the environmental magnetism data is detected as the first measured magnetism while causing the mobile body to autonomously navigate on the basis of a comparison result of the first measured magnetism and the environmental magnetism data, the mobile body to autonomously navigate on the basis of a comparison result of the second measured magnetism and the environmental magnetism data.

7. The autonomous mobile body according to claim 6, wherein the control unit causes, when unexpected magnetism is detected as the second measured magnetism while causing the mobile body to autonomously navigate on the basis of the comparison result of the second measured magnetism and the environmental magnetism data, the mobile body to autonomously navigate on the basis of the comparison result of the first measured magnetism and the environmental magnetism data.

8. The autonomous mobile body according to any one of claims 5 to 7, wherein the first magnetism sensor and the second magnetism sensor are provided to be spaced apart from each other in one or both of a traveling direction of the mobile body and a direction orthogonal to the traveling direction.

* * * * *

UNITED STATES PATENT AND TRADEMARK OFFICE
CERTIFICATE OF CORRECTION

PATENT NO. : 8,825,257 B2  
APPLICATION NO. : 13/509707  
DATED : September 2, 2014  
INVENTOR(S) : Koichi Ozaki et al.

Page 1 of 1

It is certified that error appears in the above-identified patent and that said Letters Patent is hereby corrected as shown below:

In the Claims

In column 12, line 28, Claim 5, please delete "non" and insert --no--

Signed and Sealed this
Third Day of February, 2015

Michelle K. Lee
*Deputy Director of the United States Patent and Trademark Office*